United States Patent
Elez et al.

(10) Patent No.: US 10,108,729 B2
(45) Date of Patent: Oct. 23, 2018

(54) SYSTEMS AND METHODS FOR ANONYMOUS CONSTRUCTION AND INDEXING OF VISITOR DATABASES USING FIRST-PARTY COOKIES

(71) Applicants: Petar Elez, Las Vegas, NV (US); Amir Khawaja, Round Rock, TX (US)

(72) Inventors: Petar Elez, Las Vegas, NV (US); Amir Khawaja, Round Rock, TX (US)

(73) Assignee: Cinnamon Cookie, Inc., Austin, TX (US)

( * ) Notice: Subject to any disclaimer, the term of this patent is extended or adjusted under 35 U.S.C. 154(b) by 0 days.

(21) Appl. No.: 15/782,976

(22) Filed: Oct. 13, 2017

(65) Prior Publication Data

US 2018/0107752 A1 Apr. 19, 2018

Related U.S. Application Data (60) Provisional application No. 62/408,597, filed on Oct. 14, 2016.

(51) Int. Cl.
*G06F 17/30* (2006.01)
*H04L 29/08* (2006.01)

(52) U.S. Cl.
CPC .. *G06F 17/30876* (2013.01); *G06F 17/30321* (2013.01); *G06F 17/30377* (2013.01); *H04L 67/22* (2013.01); *H04L 67/20* (2013.01)

(58) Field of Classification Search
None
See application file for complete search history.

(56) References Cited

U.S. PATENT DOCUMENTS

| | | | |
|---|---|---|---|
| 8,990,298 B1 * | 3/2015 | Anderson | H04L 67/20 709/203 |
| 9,342,617 B1 | 5/2016 | Greene et al. | |
| 9,607,308 B2 | 3/2017 | Dedeoglu et al. | |
| 9,656,144 B2 | 5/2017 | Jafarifesharaki | |
| 9,687,187 B2 | 6/2017 | Dagum | |
| 2012/0185310 A1* | 7/2012 | Greenspun | G06Q 30/0209 705/14.12 |
| 2012/0198042 A1* | 8/2012 | Dunbar | H04N 21/2181 709/223 |
| 2016/0134708 A1 | 5/2016 | Hansen et al. | |

FOREIGN PATENT DOCUMENTS

EP 1724992 A1 11/2006

OTHER PUBLICATIONS

Extended European Search Report in European Application No. 17196464.6, dated Dec. 13, 2017 (7 pages).

* cited by examiner

*Primary Examiner* — Son T Hoang
(74) *Attorney, Agent, or Firm* — Finnegan, Henderson, Farabow, Garrett & Dunner LLP (57) ABSTRACT

The disclosure includes a method for constructing and indexing a database of anonymous visitor tracking. Implementations of the disclosed methods may utilize a client-side script, first-party cookies, and canonical name records to track the visitor across affiliated websites hosted on different domain names. The disclosure also includes a system for constructing and indexing a database of anonymous visitor tracking. In one implementation, the system includes a network interface device, at least one memory storing instructions, and at least one processor that executes the instructions to receive, determine, generate and transmit first-party cookie information.

19 Claims, 7 Drawing Sheets

SYSTEMS AND METHODS FOR ANONYMOUS CONSTRUCTION AND INDEXING OF VISITOR DATABASES USING FIRST-PARTY COOKIES

CROSS REFERENCE TO RELATED APPLICATIONS

The present application claims priority to U.S. Provisional Application No. 62/408,597, filed Oct. 14, 2016, the contents of which are incorporated herein by reference.

TECHNICAL FIELD

The present disclosure generally relates to methods to construct and index visitor databases that anonymously track a visitor's actions and/or activity on one or more websites, and systems of using the same.

BACKGROUND

Many websites currently track a visitor's actions on a website and then use this information to improve a user's experience. To identify a user's journey on a website, a visitor is generally assigned a unique identifier that may be used to correlate actions taken by the visitor on the website. This identifier must be unique for each visitor. Coupling the identifier with the visited domain name may form the basis of segmenting a visitor's actions.

One method of tracking actions a visitor takes on a website may be to use web server logs, which usually contain the resource name accessed by a visitor, the time and date the resource was accessed, the Internet Protocol Address ("IP Address") of the visitor, the scheme used by the client web browser program to connect to the network server, the Transmission Control Protocol/Internet Protocol ("TCP/IP") port the connection was established with, the protocol used to access the network resource, and/or the Hypertext Transfer Protocol ("HTTP") response code. This data is usually mined once a day, or even every few hours, by using log file analysis tools. These analyzers generally search each log file associated with the domain name of the website and may subsequently feed the results back to another program for further analysis and/or storage.

Another method to log visitor activity on a website may be to write client-side script that is triggered when one or more events occur. An event may be, for example, a click on a hyperlink, the movement of a mouse pointer across the screen, or the like. The event data generally contains the unique identifier assigned to the visitor along with other event related data, such as the scheme used to connect, the scheme used to establish the network connection, any cookie data related of the domain name attached to the website, or the like. This data may then be transferred to another network server that stores this data. This transfer may be performed via an Application Program Interface ("API"), which may support the Hypertext Transfer Protocol (HTTP). The stored data may be further analyzed and/or aggregated, and the results may be stored, e.g., for reporting purposes.

When a website owner engages a third-party service provider to track visitor activities on a website, such services generally provide information about a user's journey on a given domain name but at a cost of time, money, or both to the website owner. Such services generally also rely on third-party cookies ("TPC"), which are often subject to deletion by the visitor and/or being blocked by a web browser program setting.

Website owners may set their own cookies, which may include the unique identifier assigned to a visitor, information about the visitor's preferences, (optionally) the user's login data, or the like. These cookies are called first-party cookies ("FPC") and may be less prone to deletion or being blocked. Often, these cookies may be mandatory for a visitor to properly view a website.

With TPC, website visitors may worry about personally identifiable information ("PII"), such as telephone numbers, email address, mailing address, etc., being stored and/or leaked to marketers or other third-parties who have not explicitly been granted permission by the website visitor. For this additional reason, TPC may be prone to periodic removal by the visitor. However, as explained above, FPC is less prone to removal by the website visitor. Using TPC as a means to track a visitor may, therefore, be unreliable and subject to trust issues. As a result, website visitors may periodically delete TPC. Furthermore, web browsers may offer a default policy restricting cookie storage access only to the original domain name being visited. That is, the domain name currently being browsed may be the only network resource permitted to set a cookie on the client node. At the level of the web browser program, exposing cookies of different domain names to a client-side script may pose a legitimate security threat to the website visitor, and, accordingly, most web browsers by default will not allow such access. In addition, this web browser program setting generally cannot be overridden by the owner of the client node for fear that a malware or trojan virus may take advantage of this attack vector.

The disclosed method and system for using first party cookies to anonymous track visitors overcome one or more of the problems set forth above and/or other problems of the prior art.

SUMMARY

Accordingly, embodiments of the present disclosure include a method and system for using first-party cookies to anonymous track visitors across affiliated domains.

In one embodiment, there is disclosed a method for constructing and indexing a database of anonymous visitor tracking may be executed by one or more processors. The method may comprise receiving at least one cookie from a visitor to a first domain name and, based on the at least one cookie, determining whether the visitor has an associated unique identity for the first domain name. The method may further comprise, when the visitor does not have an associated unique identity for the first domain name, determining, for each affiliated domain name in a plurality of affiliated domain names, whether the visitor has an associated unique identity for the affiliated domain name, and, when the visitor does not have an associated unique identity for the affiliated domain name, generating a unique identity associated with the visitor and storing the unique identity with the first domain name in an associated identity database. The method may further comprise updating a record associated with the unique identity with a time at which the visitor navigated to the first domain name and generating and transmitting an updated first-party cookie including the unique identity for storage on a device associated with the visitor.

In another embodiment, there is described a system for constructing and indexing a database of anonymous visitor tracking may comprise a network interface device; at least one memory storing instructions; and at least one processor that executes the instructions. The instructions may comprise instructions to receive, using the network interface device, a first-party cookie from a visitor to a first domain name and, based on the cookie, determine whether the visitor has an associated unique identity for the first domain name. the instructions may further comprise instructions to, when the visitor does not have an associated unique identity for the first domain name, determine, for each affiliated domain name in a plurality of affiliated domain names, whether the visitor has an associated unique identity for the affiliated domain name, and, when the visitor does not have an associated unique identity for the affiliated domain name, generate a unique identity associated with the visitor and store the unique identity with the first domain name in an associated identity database. The instructions may further comprise instructions to update a record associated with the unique identity with a time at which the visitor navigated to the first domain name and generate and transmit an updated first-party cookie including the unique identity for storage on a device associated with the visitor.

BRIEF DESCRIPTION OF THE DRAWINGS

The following drawings are for illustration purposes only and are not drawn to scale. Like numbers represent like features and components in the drawings. Aspects of the present disclosure may be understood with reference to the ensuing detailed description in conjunction with the accompanying drawings.

DETAILED DESCRIPTION

As described, tracking of visitors' actions on a business's websites is often done using third-party services, which typically employ third-party cookies to capture a user's actions on a website. However, the website owner generally cannot see if the visitor on one of their websites has been seen before on another affiliated website. To address these concerns, embodiments of the present disclosure include a method for constructing and indexing a database of anonymous visitor tracking. Some embodiments may include a client-side script, first-party cookies, and canonical name records to track the visitor across affiliated websites hosted on different domain names.

In certain aspects, the method may further comprise generating canonical name records that direct the plurality of affiliated domain names to an identity server storing the associated identity database.

In yet further aspects, the method may further comprise associating the unique identity with a browser program on the device associated with the visitor.

In certain aspects, the method may further comprise generating a client-side script to be executed in the browser program on the device associated with the visitor. The client-side script may be configured to transmit a network request to an identity server storing the associated identity database to receive the unique identity associated with the visitor. The client-side script may be further configured to store at least one of a first-party cookie on the browser program on the device associated with the visitor.

As one of ordinary skill would appreciate, cryptography is a method to protect data and includes both encryption (which is reversible) and hashing (which is not reversible). In certain aspects, the unique identity associated with the present disclosure may comprise a cryptographically strong unique identity of at least 256-bits. As used herein, "cryptographically strong" is used to describe an encryption algorithm, and implies, in comparison to some other algorithm (which is thus cryptographically weak), greater resistance to attack. But it can also be used to describe hashing and unique identifier and filename creation algorithms.

Figure 1:
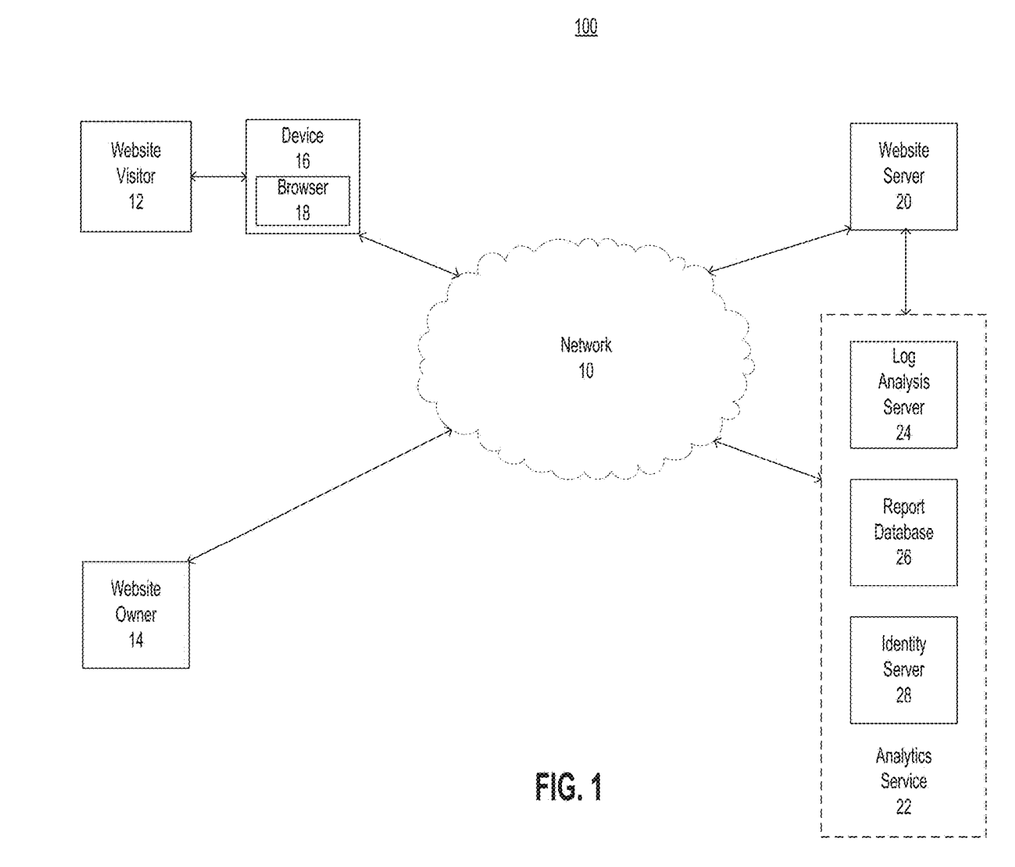
FIG. 1 illustrates an example embodiment of a system for processing a web request made by a website visitor, consistent with the present disclosure.

In an embodiment exemplified in FIG. 1, there is shown a system 100 for processing a web request made by a website visitor 12 to retrieve a website hosted on a website server 20. For example, the web request may include a URL identifying the website. In another example, the web request may include a internet protocol (IP) address identifying the website. The website visitor 12 may, for example, use a web browser program 18 (e.g., Google Chrome, Internet Explorer, Mozilla Firefox, or the like) on a device 16 associated with the visitor. For example, device 16 may comprise a desktop or laptop computer, a smartphone, a table, or any device having an operating system (OS) configured to execute the web browser program 18. In one embodiment, the website server 20 may host a single web page, a series of web pages, and/or an application programming interface (API). Although depicted as a single server in FIG. 1, website server 20 may comprise a plurality of servers, residing on a single or a plurality of server farms. Website server 20 may track the actions taken by the website visitor 12 using, for example, analytics service 22. In one embodiment, website owner 14 may register for an account with the analytics service 22.

As used herein, the term "website" refers to one or more webpages (e.g., HTML, CSS, Javascript, or the like) hosted on a website server 20 and accessible over a network 10 (e.g., the Internet, a local area network (LAN), or the like). A "website" comprises the webpages associated with a single second-level domain name (or third-level domain name, etc.). For example, all of the webpages underneath the second-level domain name cinnamoncookie.com may comprise the website cinnamoncookie.com. Accordingly, in some embodiments, visitor 12 may be tracked after first navigating to cinnamoncookie.com, continue to be tracked across various webpages of cinnamoncookie.com (such as portal.cinnamoncookie.com/register), and stop being tracked when navigating away from cinnamoncookie.com and to another second-level domain name (such as google.com).

In one embodiment, the analytics service 22 may provide one or more client-side scripts. These scripts may be embedded in the website hosted on website server 20 for execution on device 16 when the visitor 12 navigates to the website. In one embodiment, the analytics service 22 may record one or more actions of visitor 12 when on the website, e.g., using data sent to analytics service 22 from the one or more client-side scripts. For example, analytics service 22 may send the recorded data to an associated log analysis server 24 when the client-side script executes on the device 16 and/or in the web browser program 18. For example, the client-side script may send data on-demand (e.g., upon each execution) or according to a periodic schedule, whether dynamic (e.g., each time visitor 12 clicks five links, etc.) or pre-determined (e.g., every five minutes, etc.). In one embodiment, the one or more client-side scripts may also set at least one of a first-party cookie to track actions taken by the website visitor 12. The actions may include clicking on hyperlinks, remaining on a particular web page for a particular period of time, moving a cursor across or to a particular part of a screen of device 12, hovering a cursor over a particular part of the screen, or the like.

In one embodiment, the analytics service 22 may provide one or more client-side scripts. These scripts may be embedded in the website hosted on website server 20 for execution on device 16 when the visitor 12 navigates to the website. In one embodiment, the analytics service 22 may record one or more actions of visitor 12 when on the website, e.g., using data sent to analytics service 22 from the one or more client-side scripts. For example, analytics service 22 may send the recorded data to an associated log analysis server 24 when the client-side script executes on the device 16 and/or in the web browser program 18. For example, the client-side script may send data on-demand (e.g., upon each execution) or according to a periodic schedule, whether dynamic (e.g., each time visitor 12 clicks five links, etc.) or pre-determined (e.g., every five minutes, etc.). In one embodiment, the one or more client-side scripts may also set at least one of a first-party cookie to track actions taken by the website visitor 12. The actions may include clicking on hyperlinks, remaining on a particular web page for a particular period of time, moving a cursor across or to a particular part of a screen of device 12, hovering a cursor over a particular part of the screen, or the like.

In one embodiment, the log analysis server 24 may process the information received from the website visitor 12 (e.g., via the one or more client-side scripts) and/or store the information in the report database 26, for example, for aggregation. In one embodiment, the report database 26 may be a Relational Database or a NoSQL Database and may store the results of the processing performed by the log analysis server 24. In one embodiment, the website owner 14 may access the analytics report from the analytics service 22 by logging into the service. In one embodiment, the analytics service 22 may further include an identity server 28 to store credentials (e.g., a username, email, password, personal identification number (PIN), or the like) of each website owner 14 using the service. In one embodiment, after the website owner 14 validates their credentials with the identity server 28, the website owner 14 may be granted access to the reports generated by the website visitor 12 (e.g., via the one or more client-side scripts) and stored in report database 26

A report stored in report database 26 may include, for example, a time at which visitor 12 navigated to the website, a duration of time for which visitor 12 viewed the website, one or more actions of visitor 12 on the website (as discussed above) and/or times associated therewith, an identity of visitor 12, such as an IP address, a media access control (MAC) address, the unique identifier described below, or the like.

In one embodiment, the analytics service 22 may aggregate data on a per (second-level, third-level, etc.) domain name basis (as explained above). In one embodiment, if a website owner 14 wishes to see the actions of website visitor 12 across affiliated domain names, the website owner 14 generally may not do so if the analytics service 22 aggregates data on a per domain name basis. However, analytics service 22 may use a unique identifier for visitor 12, as described below, in order to permit for tracking across affiliated domains.

In one embodiment, the analytics service 22 may also track the last time an action was recorded by a website visitor 12. For example, this tracking may allow for the analytics service 22 to determine when it should count the current visit as a new session or part of the current session of the website visitor 12. In one embodiment, an example of a time span between visits may be 8 hours. The analytics service 22 may calculate a delta between the time of the last action and the current action to determine if the delta is greater than a threshold set in the analytics service 22. For example, this determination may account for the possibility that the website visitor 12 may remove the cookie set by the analytics service 22 (e.g., via the one or more client-side scripts).

To enable analytics server 22 to track website visitors 12 across affiliated domain names, website visitor 12 may be assigned a unique identifier. For example, the identifier may be globally unique and/or difficult to guess (e.g., via brute force). For example, the unique identifier may be a cryptographically strong unique identity of at least 256-bits. In one embodiment, analytics service 22 may index the data generated by the website visitors 12 over time by the unique identifier.

Figure 2:
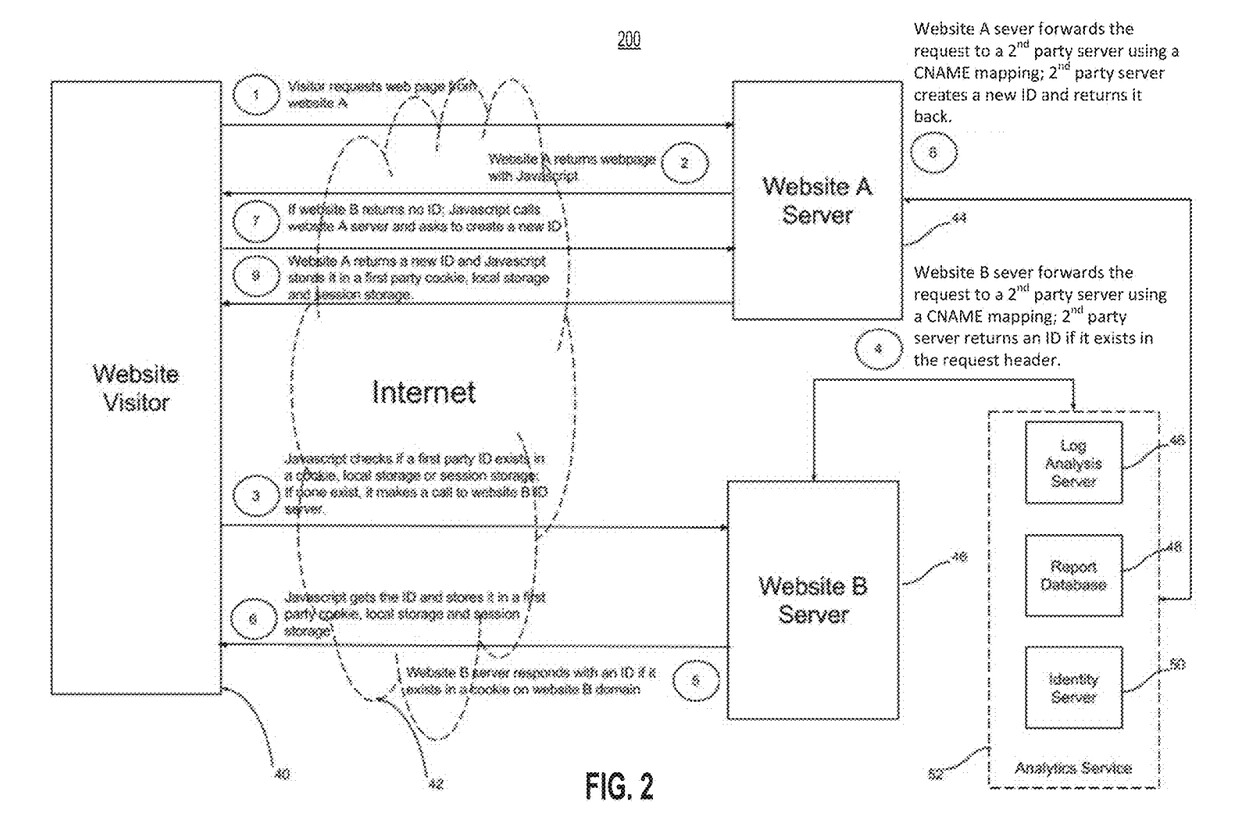
FIG. 2 illustrates an example embodiment of a network schematic of a system for tracking a visitor across domain names, consistent with the present disclosure.

FIG. 2 shows an example embodiment of the network schematic 200 of a system for tracking a visitor across affiliated domain names. In one embodiment, website visitor 40 may request a resource via the internet 42 (or other computer network) from first website server 44. Website server 44 may return the requested resource to website visitor 40. Although depicted as a webpage in FIG. 2, the requested resource may comprise other resources, such as videos, graphics, text files, pdf files, etc. In certain aspects, the resource may include a client-side script (e.g., in embodiments where the resource is a webpage, the script may be embedded therein) sent for execution to a web browser program used by the website visitor 40. Although depicted as written in Javascript in FIG. 2, the client-side script may be written in any computer programming language, such as C, C++. C#, BASIC, Ruby, assembly code, or the like.

In one embodiment, the client-side script may search for the presence of a FPC including a unique identifier assigned to the website visitor 40. For example, the script may search a cookie jar associated with the web browser program, a local storage associated with a device executing the web browser program, and/or a session storage associated with the web browser program used by website visitor 40.

In one embodiment, if the unique identifier is not found, the client-side script may generate a first cross-origin network request to affiliated server 46, which may be a canonical name (CNAME) mapped to unique identity tracking server 50. For example, the identity server 50 may receive the request along with any cookies that may have been previously set (and retrieved by the client-side script).

In one embodiment, the identity server 50 may determine if the unique identifier is included in one or more of the received cookies, and, if so, it may return this data back to the calling script (i.e., the client-side script) in the response as a JavaScript Object Notation (JSON) object. Although depicted as a JSON object in this example, other formats may be used, such as YAML, extensible markup language (XML), or the like.

In one embodiment, at that point, the client-side script may generate a second network request to the identity server 50 mapped as a sub-domain of the first website server 44 using a CNAME. Although depicted as a CNAME, in this example, other mappings may be used, such as a delegation name (DNAME), a pointer record (PTR), or the like. In certain aspects, the request may include the JSON (or other) object from the first network call.

In one embodiment, the identity server 50 may respond with instructions to the web browser program used by website visitor 40 to store the JSON (or other) object as a cookie (e.g., in the cookie jar associated with the web browser program). For example, the cookie will be stored as a FPC. In certain aspects, the FPC may have an associated expiration date (e.g., after 1 month, by the end of the year 2017, or the like). Alternatively or concurrently, identity server 50 may generate an FPC based on the JSON (or other) object and return the FPC to the web browser program used by website visitor 40 with instructions to store the FPC (e.g., in the cookie jar associated with the web browser program).

In certain aspects, the response from the second network call may also include the JSON (or other) object with instructions to store the object in the local storage of the device associated with website visitor 40 and/or in the session storage of the web browser program used by website visitor 40. Alternatively or concurrently, identity server 50 may generate a second JSON (or other) object based on the received object and return the second object with instructions to store the second object in a local storage of the device associated with website visitor 40 and/or in the session storage of the web browser program used by website visitor 40.

In one embodiment, if the unique identifier is not included in one or more of the received cookies, the identity server 50 may return an empty body in response to the first network request of the client-side script.

In one embodiment, the client-side script may then generate a third network request to the identity server 50 mapped by a sub-domain (e.g., second-level, third-level, etc.) name of the website stored on first website server 44. In certain aspects, the third network request may ask the identity server 50 to generate a new unique identity associated with the current website visitor 40. For example, the third network request may include an identifier of the visitor (such as an IP address, MAC address, or the like) and/or an identifier of the web browser program for anonymization.

In one embodiment, the identity server 50 may generate a new unique identity associated with the website visitor 40 and return a JSON payload (or other object, as explained above) in the response body and may also instruct the web browser program used by website visitor 40 to store (e.g., in a cookie jar associated with the web browser program) an FPC with a future expiration date. For example, the client-side script 40 may read the JSON (or other) object in the response and may store the response in, for example, the local storage and/or the session storage.

In one embodiment, the client-side script may directly generate the third network request if no cookies are found in the cookie jar associated with the web browser program, the local storage associated with the device executing the web browser program, and/or the session storage associated with the web browser program used by website visitor 40.

The number of network requests in the description above is only an example. In other embodiments, the potential number of network calls may depend on the number of affiliated domains and may be expressed as O(N)+1, where O is the number of requests per affiliated domain, and N is the number of affiliated domains. Accordingly, as the number of affiliated domain names increases, the number of network requests may also increase linearly. In order to reduce the number of potential network requests, each affiliate domain may be ranked, e.g., by most traffic received. This may increase the chances of the request for a unique identity being fulfilled with fewer total requests. In some embodiments, as the client-side script proceeds through the list of affiliated domains, it may stop generating requests once it has received a unique identity from any one of the affiliated domain names.

Figure 3:
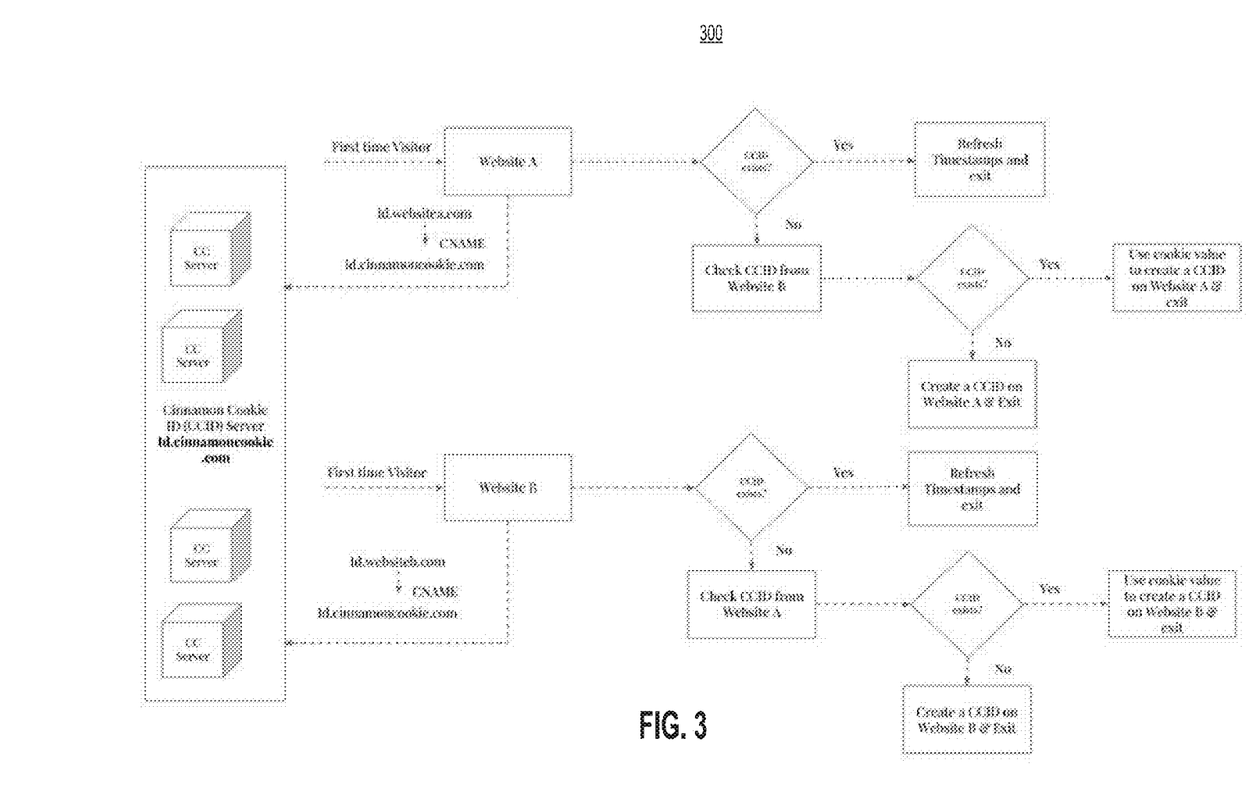
FIG. 3 illustrates an example embodiment of a flowchart diagram of a method for tracking a visitor across domain names, consistent with the present disclosure.

FIG. 3 illustrates an example embodiment of a flowchart diagram of a method for tracking a visitor across domain names. Method 300 of FIG. 3 may be implemented, for example, by system 100 of FIG. 1 and/or system 200 of FIG. 2. In the example of FIG. 3, a company has two websites (e.g., two second-level domain names), Website A and Website B. In other embodiments, however, a company may have any number of websites. If a visitor to Website A is a first time visitor for Website A, a check may be performed to determine whether the visitor has a unique identity (e.g., from visiting Website A previously). If the visitor has an associated unique identity, then a record indexed by the unique identity may be updated to include the visit to Website A as the last time the visitor has navigated to an affiliated website. If the visitor does not have an associated unique identity, then a request may be sent to the affiliated Website B to determine whether this visitor has previously navigated to Website B. If the visitor has not previously navigated to Website B, then Website A may ask an identity server to create a new unique identity for the visitor. On the other hand, if the visitor has previously navigated to Website B, then the unique identity that was assigned on Website B may also be used on Website A. A similar process may be performed, for example, if a visitor to Website B is a first time visitor for Website B.

Figure 4:
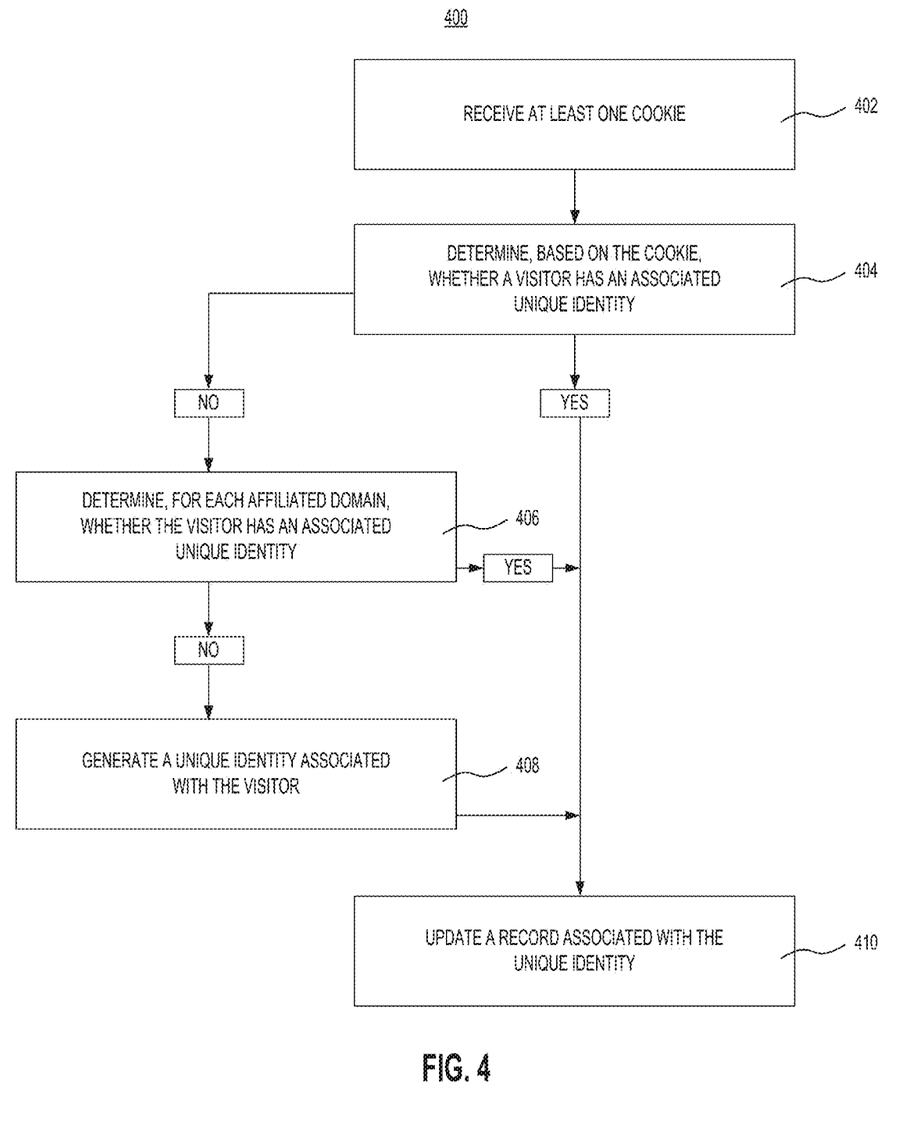
FIG. 4 illustrates another example embodiment of a flowchart diagram of a method for tracking a visitor across domain names, consistent with the present disclosure.

FIG. 4 illustrates another example embodiment of a flowchart diagram of a method for tracking a visitor across domain names. Method 400 of FIG. 4 may be executed, for example, by an identity server (e.g., identity server 40 of FIG. 1 and/or identity server 50 of FIG. 2), which may comprise, for example, server 600 of FIG. 6.

At step 402, the identity server may receive at least one cookie from a visitor to a first domain name (which may be a second-level domain name, a third-level domain name, or the like). For example, the system may receive the at least one cookie from a client-side script. The at least one cookie may be included in a network request or sent separately. The script may extract the at least one cookie from a cookie jar and/or a session storage associated with a web browser program used by the visitor and/or a local storage of a device associated with the visitor. In certain aspects, the script may extract all cookies from the cookie jar, the session storage, and/or the local storage. Alternatively, the script may extract a subset of the cookies in the cookie jar, the session storage, and/or the local storage. For example, the script may determine the subset based on which cookies are associated with and/or contain a reference to the first domain name.

In some embodiments, the system may receive the at least one cookie from a website host server. The website host server may send a request for a unique identity including the at least one cookie or may send the at least one cookie separately.

At step 404, based on the at least one cookie, the identity server may determine whether the visitor has an associated unique identity for the first domain name. For example, the identity server may attempt to extract the unique identity from one or more of the at least one cookies. Alternatively or concurrently, the identity server may use one or more pieces of information from the at least one cookie to check against a databased indexed with unique identities. For example, the identity server may use an IP address, a MAC address, or other information to attempt to extract the unique identity.

In some embodiments, if the identity server determines the unique identity, method 400 may proceed directly to step 410. In such embodiments, if the identity server cannot determine the unique identity, method 400 may proceed to step 406.

At step 406, when the visitor does not have an associated unique identity for the first domain name, the identity server may determine, for each affiliated domain name in a plurality of affiliated domain names, whether the visitor has an associated unique identity for the affiliated domain name. For example, the identity server may request, from the visitor (or from a client side script executed on the device associated with the visitor) at least one cookie associated with and/or containing a reference to one or more affiliated domain names in the plurality of affiliated domain names. Alternatively or concurrently, the identity server may send a request for the unique identity to a website server hosting the affiliated domain name. The request may include the at least one cookie and/or information extracted therefrom.

In some embodiments, the determination of step 406 may be performed serially. That is, the identity server may determine whether an associated unique identity exists by proceeding through the plurality of affiliated domain names one-by-one. Alternatively or concurrently, the identity server may make simultaneous determinations, e.g., by sending a single request (or approximately concurrent requests) for cookies associated with and/or containing a reference to a plurality of affiliated domains and/or by sending approximately concurrent requests to website host servers of affiliated domains.

In some embodiments, if the identity server determines the unique identity based on the affiliated domain names, method 400 may proceed directly to step 410. In such embodiments, if the identity server cannot determine the unique identity, method 400 may proceed to step 408.

At step 408, when the visitor does not have an associated unique identity for the affiliated domain name, the identity server may generate a unique identity associated with the visitor. The identity server may further store the unique identity with the first domain name in an associated identity database. Alternatively or concurrently, the identity server may transmit the unique identity to a website server hosting the first domain for associated with the visitor and/or for storage in a database.

At step 410, the identity server may update a record associated with the unique identity with a time at which the visitor navigated to the first domain name. In addition, the identity server may update the record with one or more actions of the visitor. The actions may be received from the client-side script.

Method 400 may further include additional steps. For example, method 400 may include generating and transmitting an updated first-party cookie including the unique identity for storage on a device associated with the visitor. The cookie may be stored in the cookie jar, the session storage, and/or the local storage. In some embodiments, the cookie may comprise a JSON (or other) object.

By way of further example, method 400 may include generating canonical name records that direct a plurality of affiliated domain names to an identity server storing the associated identity database. Such name records may be generated when a website owner registers for an analytics service administered by (or otherwise associated with) the identity server. For example, the website owner may provide one or more domain names (e.g., second-level domain names, third-level domain names, etc.) to register as the plurality of affiliated domain names.

By way of additional example, method 400 may include generating a client-side script to be executed in the browser program on the device associated with the visitor. The client-side script may be configured to execute method 500 of FIG. 5 or a variation thereof.

Figure 5:
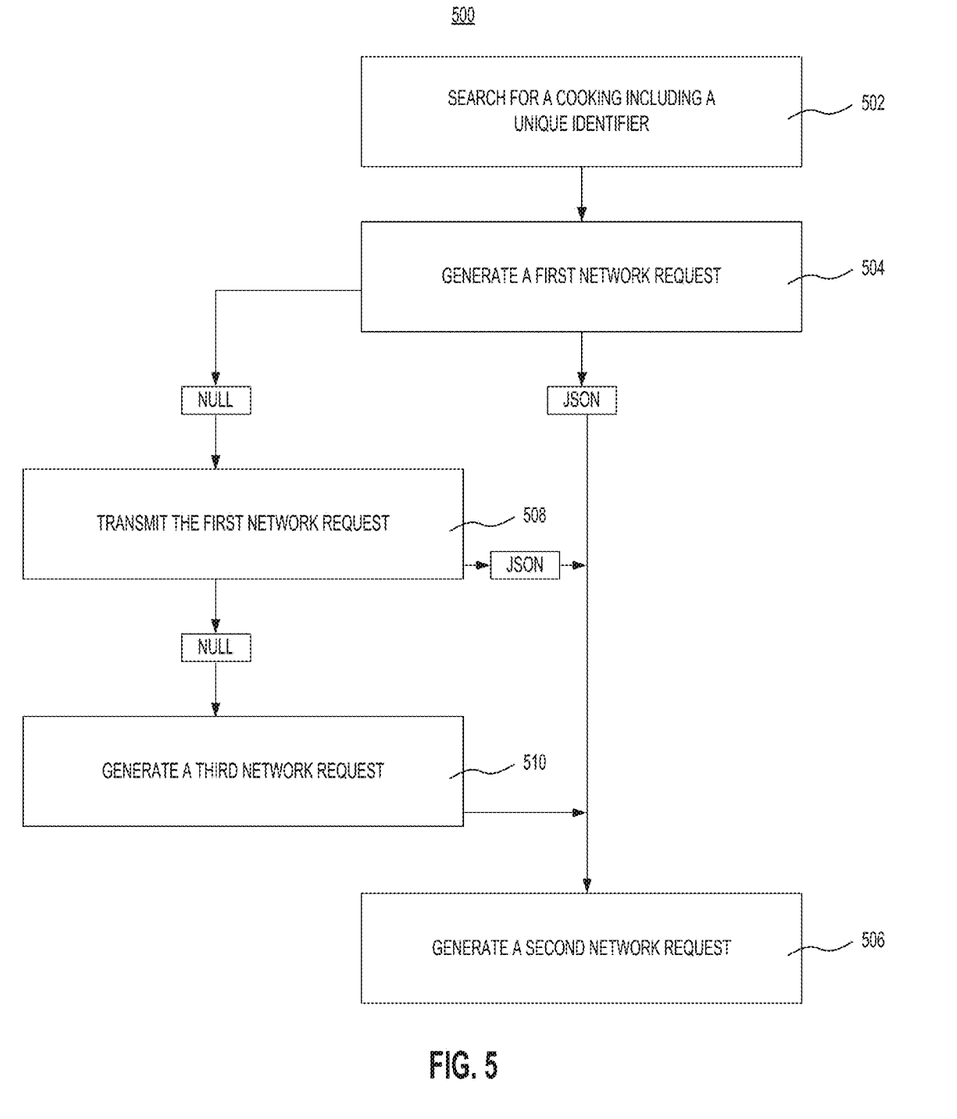
FIG. 5 illustrates an example personalized view of a website for a visitor based on tracking the visitor across domain names, consistent with the present disclosure.

FIG. 5 illustrates yet another example embodiment of a flowchart diagram of a method for tracking a visitor across domain names. Method 500 of FIG. 5 may be implemented, for example, by a client-side script (as described above), which may be executed by at least one processor of a device associated with a website visitor (such as a laptop or desktop computer, a smartphone, a tablet, or the like).

At step 502, the script may search for a cookie including a unique identifier assigned to the website visitor. For example, the script may execute step 502 when the website visitor navigates to a first domain name (which may be a second-level domain name, a third-level domain name, or the like). In some embodiments, the script may search for the cookie in a cookie jar associated a web browser program used by the website visitor, a local storage associated with the device executing the web browser program, and/or a session storage associated with the web browser program used by the website visitor. The search may be defined by one or more parameters, e.g., whether the cookie is associated with and/or contains a reference to the first domain name.

At step 504, the script may generate a first network request to an identity server. Alternatively, the script may generate a first network request to an affiliated server, which may be mapped to the identity server (e.g., through a canonical name). In some embodiments, the request may include any cookies retrieved in step 502 and/or information extracted therefrom.

At step 506, if the script receives a JSON (or other object) in response to the first request, the script may generate a second network request to the identity server (or to the affiliated server). The second request may include the received JSON (or other object), information extracted therefrom, and/or information about the visitor for recording in the identity server. For example, information about the visitor may include a time at which the visitor navigated to the first domain name, one or more actions performed by the visitor, or the like. In certain aspects, the second request may further include an identification of the visitor (such as an IP address, MAC address, or the like) and/or may further include an identification of the web browser program.

At step 508, if the script receives a null answer in response to the first request, the script may transmit the first network request to other affiliated servers associated with a plurality of affiliated domain names (which may be mapped to the identity server, e.g., through a canonical name). The script may first re-generate the first network request before transmitting it to the other affiliated servers. In some embodiments, the script may again search for cookies, e.g., using new parameters, such as whether the cookie is associated with and/or contains a reference to one or more of the plurality of affiliated domain names.

In some embodiments, the script may execute step 508 for the plurality of affiliated domain names serially. That is, the script may transmit the first network request to a first affiliated server associated with a first affiliated domain name of the plurality of affiliated domain names; if the script receives a JSON (or other) object in response, the script may proceed to step 506; if the script receives a null answer, the script may proceed to transmit the first network request to a second affiliated server associated with a second affiliated domain name of the plurality of affiliated domain names; and so forth. Alternatively or concurrently, the script may transmit the first network request approximately simultaneously to the plurality of affiliated servers associated with the plurality of affiliated domains names.

At step 510, if the script receives a null answer from all of the plurality of affiliates servers, the script may generate a third network request to the identity server. For example, the third network request may ask the identity server to generate a new unique identity associated with the website visitor. The third network request may include an identifier of the visitor (such as an IP address, MAC address, or the like) and/or an identifier of the web browser program for anonymization. The script may then proceed to step 506, generating the second network request using the received unique identity.

Method 500 may further include additional steps. For example, in response to the second network request, the script may receive a cookie including the unique identity with instructions to store the cookie (e.g., in the cookie jar associated with the web browser program). In some embodiments, the cookie may comprise a JSON (or other) object.

Figure 6:
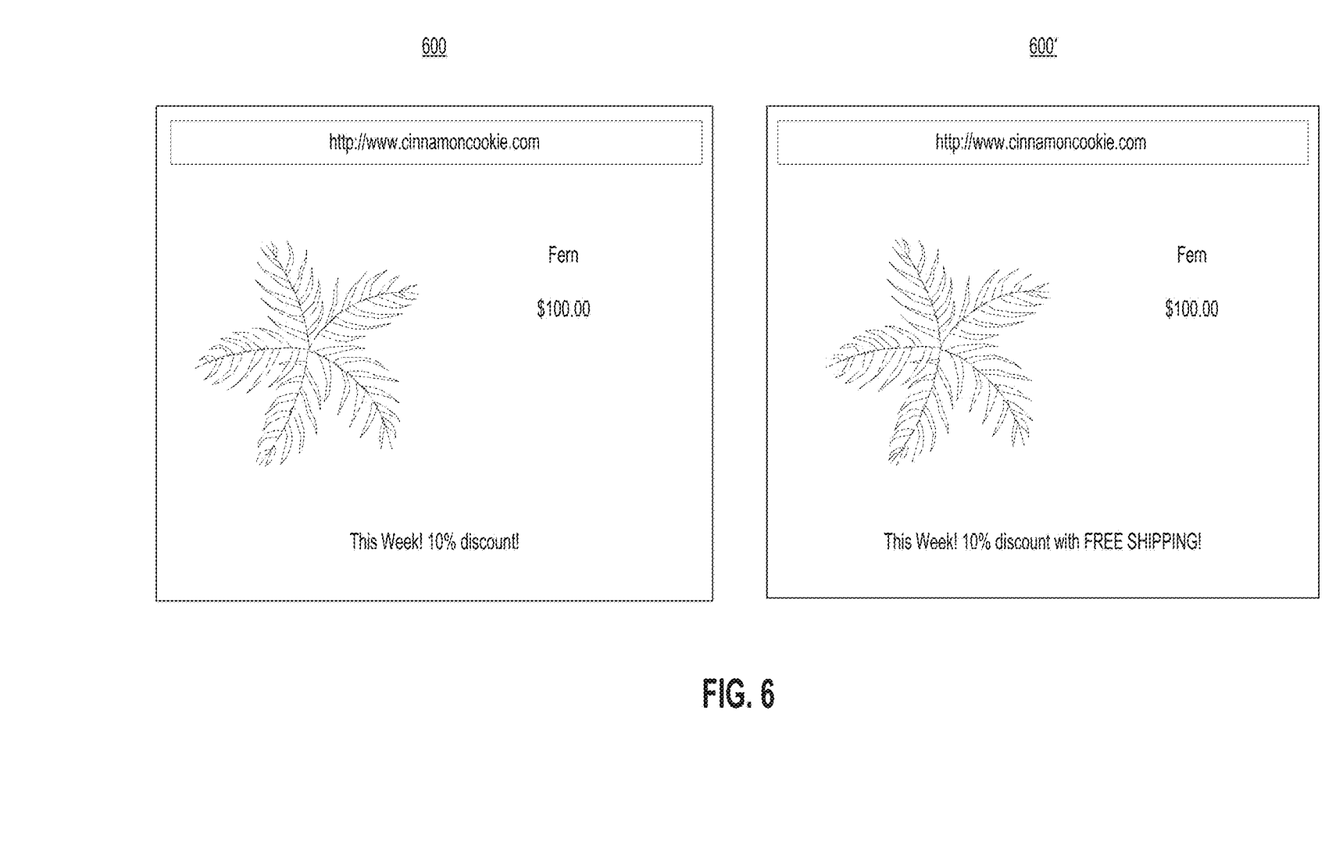
FIG. 6 illustrates an example server for executing one or more methods of the present disclosure.

FIG. 6 illustrates an example embodiment of a personalized view of a website for a visitor based on tracking the visitor across domain names (e.g., by using method 300 of FIG. 3 and/or method 400 of FIG. 4). Website 600 shows an example of a default view of a product presented to the visitor. The example includes a 10% discount, which may be a default discount offered to all visitors at the time. On the other hand, Website 600' shows an example of a personalized view of the product presented to the visitor. The example includes free shipping in addition to the 10% discount. Website 600' may be presented to the visitor if, for example, the visitor is determined to have visited a domain name affiliated with website 600'. The determination may be made using the systems and/or methods of the present disclosure. By offering the additional free shipping to the visitor that has already visited an affiliated domain name, the visitor may be provided an additional incentive to make a purchase decision immediately rather than later.

Accordingly, aspects of the present disclosure may enable a website owner to follow the journey of an anonymous visitor across affiliated domain names in real-time via clickstream data sent to a tracking or analytics server. In one embodiment, the analytics server may store this browsing history of a visitor from each device used by the visitor.

Figure 7:
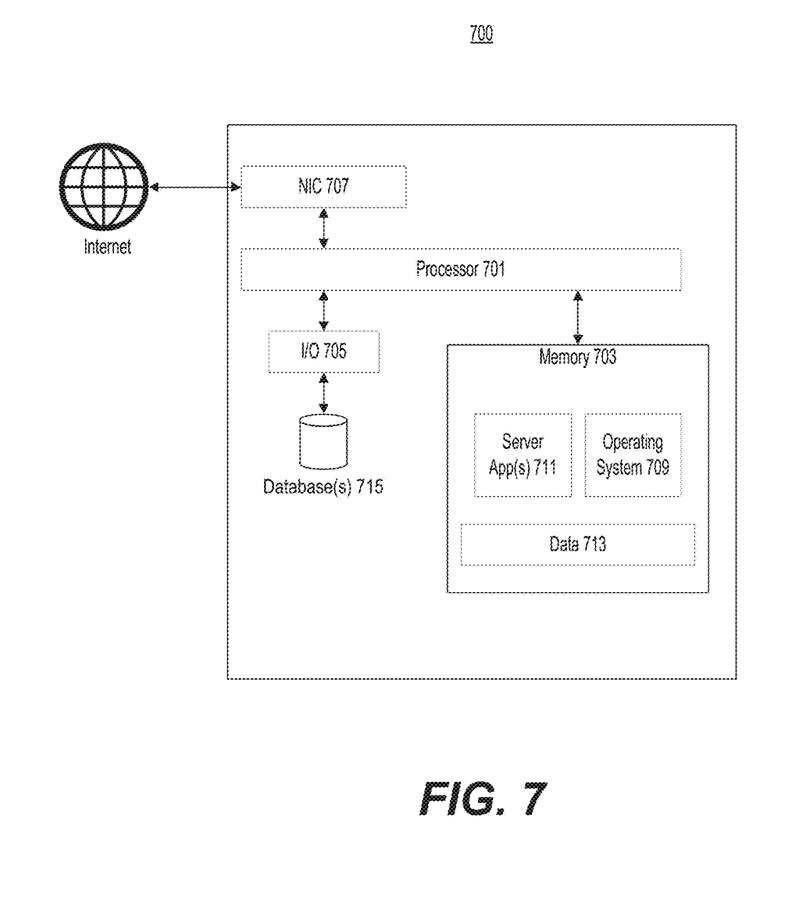
FIG. 7 is a depiction of exemplary server for use in constructing and indexing a database of anonymous visitor tracking and/or tracking a visitor across domain names of the present disclosure.

FIG. 7 is a depiction of exemplary server 700 for use in constructing and indexing a database of anonymous visitor tracking and/or tracking a visitor across domain names. As depicted in FIG. 7, server 700 may have a processor 701. Processor 701 may comprise a single processor or a plurality of processors. As explained above, processor 701 may comprise a CPU, a GPU, a reconfigurable array (e.g., an FPGA or other ASIC), or the like.

Processor 701 may be in operable connection with a memory 703, an input/output module 705, and a network interface controller (NIC) 707. Memory 703 may comprise a single memory or a plurality of memories. In addition, memory 703 may comprise volatile memory, non-volatile memory, or a combination thereof. As depicted in FIG. 7, memory 703 may store one or more operating systems 709 and one or more server applications 711. In addition, memory 703 may store data 713 produced by, associated with, or otherwise unrelated to operating system 709 and/or server applications 711.

Input/output module 705 may store and retrieve data from one or more databases 715. For example, database(s) 715 may include an audience database and/or user database consistent with the present disclosure. NIC 707 may connect server 700 to one or more computer networks. In the example of FIG. 7, NIC 707 connects server 700 to the Internet. Server 700 may receive data and instructions over a network using NIC 707 and may transmit data and instructions over a network using NIC 707.

Processor 701 may execute methods 300 and/or 400 of FIGS. 3 and 4, respectively. Accordingly, server 700 may, for example, construct and index a database of anonymous visitor tracking and/or track a visitor across domain names.

The foregoing description has been presented for purposes of illustration. It is not exhaustive and is not limited to precise forms or embodiments disclosed. Modifications and adaptations of the embodiments will be apparent from consideration of the specification and practice of the disclosed embodiments.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps and/or inserting or deleting steps.

Instructions or operational steps stored by a computer-readable medium may be in the form of computer programs, program modules, or codes. As described herein, computer programs, program modules, and code based on the written description of this specification, such as those used by the processor, are readily within the purview of a software developer. The computer programs, program modules, or code can be created using a variety of programming techniques. For example, they can be designed in or by means of C++, Java, Verilog Hardware Description Language, VHSIC Hardware Description Language, or any such programming languages. One or more of such programs, modules, or code can be integrated into a device system or existing communications software. The programs, modules, or code can also be implemented or replicated as firmware or circuit logic.

Embodiments of the present are described more fully with reference to the drawings, which form a part hereof, and which show, by way of illustration, specific embodiments of the present disclosure. However, the disclosure should not be construed as limited to the embodiments set forth herein. Rather, the disclosed embodiments are provided so that this disclosure will be thorough and complete, and will fully convey the scope to those skilled in the art.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the inventions.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

What is claimed is:

1. A method for constructing and indexing a database of anonymous visitor tracking, the method executed by one or more processors and comprising:
   receiving at least one cookie from a visitor to a first domain name;
   based on the at least one cookie, determining whether the visitor has an associated unique identity for the first domain name;
   when the visitor has the associated unique identity for the first domain name, updating a record indexed by the associated unique identity with a time at which the visitor navigated to the first domain name;
   when the visitor does not have the associated unique identity for the first domain name, determining, for each affiliated domain name in a plurality of affiliated domain names, whether the visitor has an associated unique identity for the affiliated domain name;
   when the visitor has the associated unique identity for an affiliated domain name in the plurality of affiliated domain names, updating a record indexed by the associated unique identity with the time at which the visitor navigated to the first domain name as one of the plurality of affiliated domain names;
   when the visitor does not have the associated unique identity for the affiliated domain name:
      generating a unique identity associated with the visitor and storing the unique identity with the first domain name in an associated identity database;
      generating canonical name (CNAME) records that direct the plurality of affiliated domain names to an identity server storing the associated identity database;
      updating a record indexed by the generated unique identity with the time at which the visitor navigated to the first domain name; and
      generating and transmitting at least one first-party cookie including the unique identity for storage on a device associated with the visitor.

2. The method of claim 1, further comprising associating the unique identity with a browser program on the device associated with the visitor.

3. The method of claim 2, further comprising:
   generating a client-side script to be executed in the browser program on the device associated with the visitor, wherein the client-side script is configured to transmit a network request to the identity server storing the associated identity database to receive the unique identity associated with the visitor.

4. The method of claim 3, wherein the client-side script is further configured to store the at least one first-party cookie on the browser program on the device associated with the visitor.

5. The method of claim 4, wherein the unique identity comprises an identity of at least 256-bits.

6. The method of claim 5, further comprising transmitting the unique identity and URL data associated with the first domain name to another program configured to construct a database including a history of affiliated domain names viewed by the visitor.

7. The method of claim 3, wherein the network request transmitted by the client-side script comprises a cross-origin network request to a canonical name in the canonical name records that is mapped to the identity server.

8. A system for constructing and indexing a database of anonymous visitor tracking, the system comprising:
   a network interface device;
   at least one memory for storing instructions; and
   at least one processor that executes the instructions to:
      receive at least one cookie from a visitor to a first domain name;
      based on the at least one cookie, determining whether the visitor has an associated unique identity for the first domain name;
      when the visitor has the associated unique identity for the first domain name, update a record indexed by the associated unique identity with a time at which the visitor navigated to the first domain name;
      when the visitor does not have the associated unique identity for the first domain name, determine, for each affiliated domain name in a plurality of affiliated domain names, whether the visitor has an associated unique identity for the affiliated domain name;
      when the visitor has the associated unique identity for an affiliated domain name in the plurality of affiliated domain names, update a record indexed by the associated unique identity with the time at which the visitor navigated to the first domain name as one of the plurality of affiliated domain names;
      when the visitor does not have the associated unique identity for the affiliated domain name:
         generate a unique identity associated with the visitor and storing the unique identity with the first domain name in an associated identity database;
         generate canonical name (CNAME) records that direct the plurality of affiliated domain names to an identity server storing the associated identity database;
         update a record indexed by the generated unique identity with the time at which the visitor navigated to the first domain name; and
         generate and transmit at least one first-party cookie including the unique identity for storage on a device associated with the visitor.

9. The system of claim 8, wherein the processor comprises a single processor or a plurality of processors.

10. The system of claim 9, wherein the processor comprises a CPU, a GPU, or a reconfigurable array.

11. The system of claim 8, wherein the processor is in operable connection with the memory and the network interface device.

12. The system of claim 8, wherein the memory comprises a single memory or a plurality of memories that are sufficient to store one or more operating systems and one or more server applications.

13. The system of claim 8, wherein the memory comprises volatile memory, non-volatile memory, or a combination thereof.

14. The system of claim 8, wherein the memory stores data produced by, associated with, or otherwise unrelated to the system.

15. The system of claim 8, further comprising an input/output module to store and retrieve data from one or more databases.

16. The system of claim 15, wherein the one or more databases include at least one of an audience database or user database.

17. The system of claim 8, wherein the at least one processor is further configured to associate the unique identity with a browser program on the device associated with the visitor.

18. The system of claim 17, wherein the at least one processor is further configured to:
   generate a client-side script to be executed in the browser program on the device associated with the visitor, wherein the client-side script is configured to transmit a network request to the identity server storing the associated identity database to receive the unique identity associated with the visitor.

19. The method of claim 18, wherein the network request transmitted by the client-side script comprises a cross-origin network request to a canonical name in the canonical name records that is mapped to the identity server.

\* \* \* \* \*